United States Patent
Blasco

(10) Patent No.: US 9,639,369 B2
(45) Date of Patent: May 2, 2017

(54) SPLIT REGISTER FILE FOR OPERANDS OF DIFFERENT SIZES

(71) Applicant: Apple Inc., Cupertino, CA (US)

(72) Inventor: Conrado Blasco, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 778 days.

(21) Appl. No.: 14/076,660

(22) Filed: Nov. 11, 2013

(65) Prior Publication Data

US 2015/0134935 A1    May 14, 2015

(51) Int. Cl.
G06F 9/38    (2006.01)
G06F 9/30    (2006.01)

(52) U.S. Cl.
CPC .......... *G06F 9/384* (2013.01); *G06F 9/30112* (2013.01)

(58) Field of Classification Search
CPC .. G06F 9/30109; G06F 9/30112; G06F 9/384; G06F 9/345
See application file for complete search history.

(56) References Cited

U.S. PATENT DOCUMENTS

| | | | |
|---|---|---|---|
| 5,673,426 A | 9/1997 | Shen et al. | |
| 6,253,314 B1 | 6/2001 | Itoh | |
| 6,266,755 B1 | 7/2001 | Yeager | |
| 6,393,546 B1 | 5/2002 | Witt et al. | |
| 6,560,694 B1 | 5/2003 | McGrath et al. | |
| 6,802,017 B1 | 10/2004 | Takayama et al. | |
| 6,889,312 B1 | 5/2005 | McGrath et al. | |
| 7,284,115 B2 * | 10/2007 | McGrath | G06F 9/30101 712/210 |
| 7,877,582 B2 * | 1/2011 | Gschwind | G06F 9/30036 712/226 |
| 8,914,619 B2 | 12/2014 | Greiner et al. | |
| 9,317,285 B2 | 4/2016 | Gupta et al. | |
| 2006/0010292 A1 * | 1/2006 | DeVale | G06F 9/3824 711/118 |
| 2007/0294507 A1 * | 12/2007 | Veidenbaum | G06F 9/3012 712/10 |
| 2008/0016326 A1 | 1/2008 | Svendsen et al. | |
| 2008/0077773 A1 | 3/2008 | Julier et al. | |

(Continued)

OTHER PUBLICATIONS

U.S. Appl. No. 13/460,178, James B. Keller, filed Apr. 30, 2012.

(Continued)

*Primary Examiner* — Eric Coleman
(74) *Attorney, Agent, or Firm* — Meyertons, Hood, Kivlin, Kowert & Goetzel, P.C.; Lawrence J. Merkel

(57) ABSTRACT

In an embodiment, a processor includes a register file having multiple widths corresponding to different operands sizes of a given data type implemented by the processor. For example, the integer register file may have 32 bit and 64 bit widths for 32 and 64 bit operand sizes. The register file may have a section of registers for each operand size, and the map unit may allocate registers from the appropriate section for each instruction operation based on the operand size of that instruction operation. The register file may consume less integrated circuit area than another register file having the same number of registers, all of which are implemented at the largest operand size. In some embodiments, only the register file and the map unit (specifically the free list management logic in the map unit) are changed to implement the multiple-width register file.

20 Claims, 4 Drawing Sheets

(56) References Cited

U.S. PATENT DOCUMENTS

| | | | | |
|---|---|---|---|---|
| 2011/0161945 A1* | 6/2011 | Kalogeropulos | ....... | G06F 8/441 |
| | | | | 717/152 |
| 2011/0231633 A1* | 9/2011 | Grisenthwaite | ....... | G06F 9/3001 |
| | | | | 712/208 |
| 2012/0151189 A1 | 6/2012 | Kruecken | | |
| 2012/0233444 A1* | 9/2012 | Stephens | ............... | G06F 9/3016 |
| | | | | 712/210 |
| 2014/0013085 A1* | 1/2014 | Vats | ........................ | G06F 9/384 |
| | | | | 712/217 |

OTHER PUBLICATIONS

Office Action, U.S. Appl. No. 13/460,178, mailed May 12, 2015, 6 pages.
Office Action, U.S. Appl. No. 13/460,178, mailed Sep. 22, 2015, 7 pages.

\* cited by examiner

SPLIT REGISTER FILE FOR OPERANDS OF DIFFERENT SIZES

BACKGROUND

Field of the Invention

This invention is related to register files in processors.

Description of the Related Art

As instruction set architectures have evolved over time, new instructions and data types have been added. Additionally, in some cases, larger sizes of the same data type have been added. Notably, for example, integer data sizes have been increased from 32 bits to 64 bits. The larger integer data size permits native support in the processor for larger integer ranges. While having a larger integer range can be helpful for some applications, many applications do not require the larger integer range. If a larger integer data size is used where a smaller integer data size would suffice, the locations in which the integer is stored (e.g. in data structures in memory) require more space. Fewer of the larger integers fit in a cache block as well. Accordingly, the size of the data operated on by the application may expand unnecessarily and lead to performance decrease due to higher memory latency, on average. On the other hand, the increase in integer data sizes also increases the addressable memory, which can be a positive influence on performance even if the smaller integer data size is sufficient for various integers manipulated by the application.

Because of the above issues, some instruction set architectures still support the 32 it integer data size when operating in 64 bit integer mode. Thus, a given instruction may be defined to use a 32 bit or 64 bit integer as a source operand and to produce a 32 bit or 64 bit integer as a result (destination operand). In the case of a 32 bit result being written to a register, some instruction set architectures define the result as being written to a portion of the 64 bit integer register (e.g. the least significant portion) and defines a result for the remaining portion (e.g. zero). That is, the architected integer registers are 64 bit registers, and 32 bit results are written to one half of the registers. If the result is later stored to memory, a 32 bit write may be used to avoid retaining the remaining portion if it is uninteresting to the code being executed. On the other hand, when 64 bit integers are desired (e.g. for addressing), the registers and execution hardware to handle the 64 bit integers is available. If a significant number of operands/results in typical code are 32 bit integers, the amount of space occupied by the 64 bit register file and effectively not used by the 32 bit integers is effectively wasted space.

SUMMARY

In an embodiment, a processor includes a physical register file having multiple widths corresponding to different operands sizes of a given data type implemented by the processor. For example, the integer physical register file may have 32 bit and 64 bit widths for 32 and 64 bit operand sizes. The physical register file may have a section of registers for each operand size, and the map unit may allocate registers from the appropriate section for each instruction operation based on the operand size of that instruction operation. The physical register file may consume less integrated circuit area than another physical register file having the same number of registers, all of which are implemented at the largest operand size. In some embodiments, only the physical register file and the map unit (specifically the free list management logic in the map unit) are changed to implement the multiple-width register file. Other circuitry may be "unaware" of the change.

BRIEF DESCRIPTION OF THE DRAWINGS

The following detailed description makes reference to the accompanying drawings, which are now briefly described.

Figure 1:
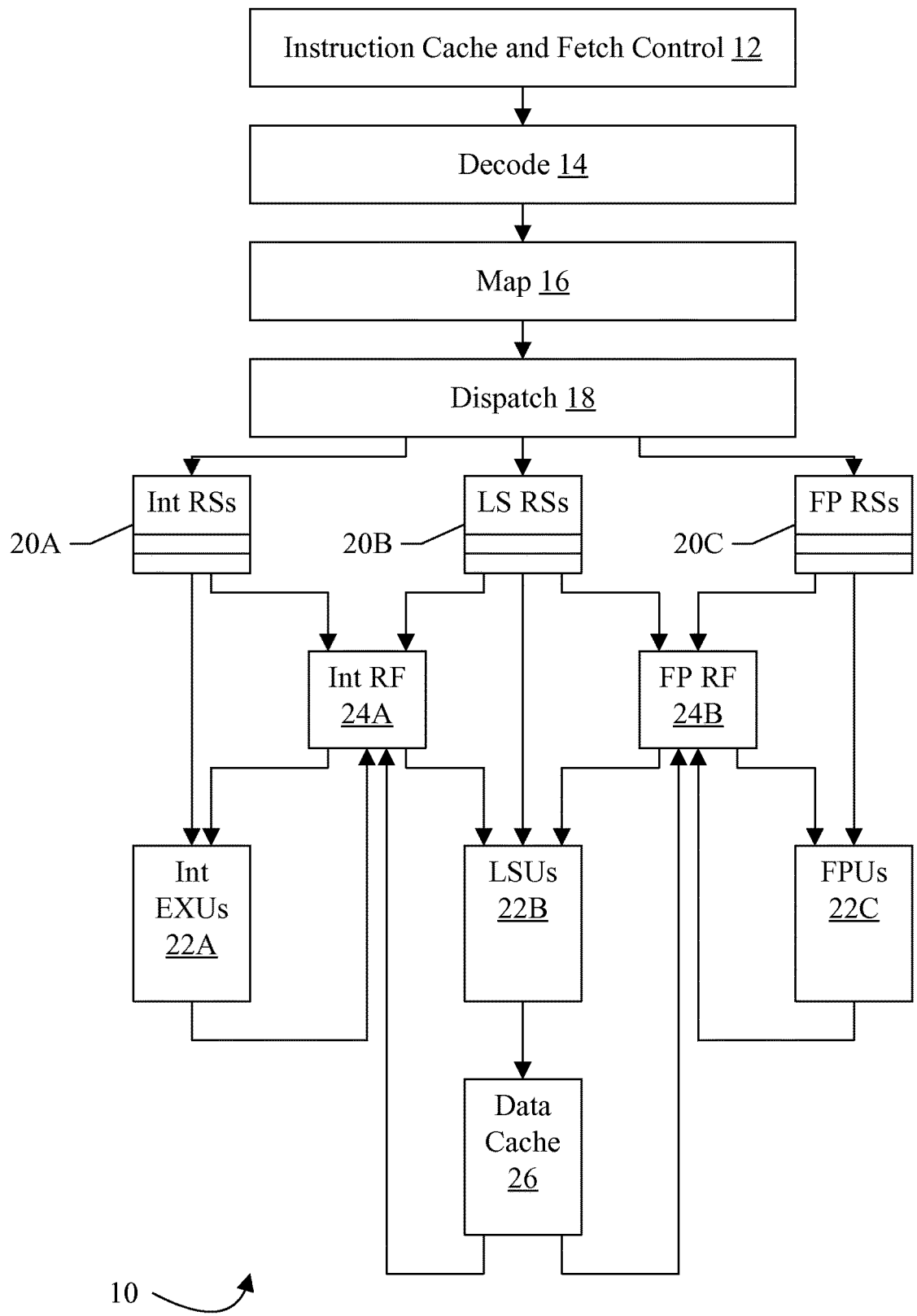
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a block diagram of one embodiment of a portion of a processor 10 is shown. In the illustrated embodiment, the processor 10 includes an instruction cache and fetch control unit 12, a decode unit 14, a map unit 16, a dispatch unit 18, a set of reservation stations 20A-20C, a set of execution units 22A-22C, one or more physical register files 24A-24B, and a data cache 26. The instruction cache and fetch control unit 12 is coupled to the decode unit 14, which is coupled to the map unit 16. The map unit 16 is coupled to the dispatch unit 18, which is further coupled to the reservation stations 20A-20C. The reservation stations 20A-20C are coupled to respective execution units 22A-22C. The reservation stations 20A-20B are coupled to the physical register file 24A; and the reservation stations 20B-20C are coupled to the physical register file 24B. The physical register file 24A is coupled to the execution units 22A-22B and the data cache 26; and the physical register file 24B is coupled to the execution units 22B-22C and the data cache 26. The execution unit 22B is coupled to the data cache 26.

The instruction cache and fetch control unit 12 may be configured to cache instructions previously fetched from memory, and may be configured to speculatively fetch a stream of instructions for the processor 10. The instruction cache and fetch control unit 12 may implement various prediction structures to predict the fetch stream. For example, a next fetch predictor may be used to predict fetch addresses based on previously executed instruction streams. Branch predictors of various types may be used to verify the next fetch prediction, or may be used to predict next fetch addresses if the next fetch predictor is not used.

The decode unit 14 may be configured to decode the instructions into instruction operations that are executable by the execution units 22A-22C. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 10 may be decoded into a single instruction operation, and thus the instruction operation may be essentially synonymous with instruction (although it may be modified in form by the decoder). The term "instruction operation" may be more briefly referred to herein as "op."

The map unit 16 may be configured to perform register renaming on the ops, assigning physical registers in the physical register files 24A-24B for each architected source and destination register in the ops. More particularly, the map unit 16 may maintain a current mapping of the architected registers (the registers that are visible to programmers, specified in the instruction set architecture implemented by the processor 10) to physical registers in the physical register files 24A-24B. The physical registers may be the registers actually implemented in the processor 10, and the number of physical registers may exceed the number of architected registers. In this fashion, various committed and speculative results may be stored in the physical register files 24A-24B and may be accessible to ops that are being executed. The physical register files 24A-24B may be more briefly referred to herein as "register files" and the physical registers may be referred to as "registers." The architected registers will be referred to as architected registers to distinguish from the physical registers.

There may be a variety of data types specified in the instruction set architecture, and there may be architected registers for each data type. Generally, a data type may refer to the representation/interpretation of the data in the registers. Exemplary data types may be integer, fixed point, floating point, vector, media, etc. A given instruction may be defined to operate on a given data type, and thus references to architected registers in the given instruction are references to the architected register set associated with that data type.

The register files 24A-24B may be one or more sets of physical registers which may be mapped to the architected registers coded into the instructions stored in the instruction cache and fetch control unit 12. There may be separate physical registers for different data types (e.g. integer, media, floating point, etc.) in an embodiment. The register files 24A-24B may be configured to output operands read in response to ops issued for execution by the reservation stations 20A-20C to the respective execution units 22A-22C. The register files 24A-24B may also be configured to capture results generated by the execution cores 22A-22C (and the data cache 26 for load ops) and written to the destination registers of the ops. In the embodiment of FIG. 1, the register file 24A may be integer registers (i.e. they may store values of the integer data type) and the register file 24B may be floating point registers (i.e. they may store values of the floating point data type).

Some data types may also support more than one operand size. For example, the integer data type may support 32 bit integers and 64 bit integers. Other embodiments may support additional operand sizes such as 8 bit and 16 bit, or even larger operand sizes. Generally, the operand size may refer to the number of bits constituting a complete operand value. Other data types may support different operand sizes as well (e.g. single precision, double precision, and extended precision floating point sizes). The 32 and 64 bit integers will be used as an example for the remainder of this description, but the techniques and technology described below may be expanded to any data type and corresponding supported operand sizes. Generally, the instruction set architecture may specify that the architected registers for a data type having multiple operand sizes are the same size as the largest operand size. For operand sizes less than the largest size, the instruction set architecture may specify the result to be stored in the architected register for the bits that are not updated for a smaller result. For example, the instruction set architecture may specify that the architected register is zero, sign extended from the result, or undefined in the portion not updated by the smaller result.

To reduce the amount of area occupied by the integer register file 24A, the register file may be implemented in portions, one for each supported operand size. Thus, in this embodiment, there are two portions corresponding to the 32 bit and 64 bit integer operand sizes. The 32 bit portion may be implemented as 32 bit registers, while the 64 bit portion may have 64 bit registers. By not implementing 64 bit registers for every physical register in the register file 24A, area may be reduced as compared to a full 64 bit register file. The number of registers included in each portion may be based on expected distribution of 32 bit and 64 bit integer operand sizes in the code executed by the processor 10. For example, studies of common code sequences for the processor 10 indicate that about 60% of the integer operands, on average, are 64 bit and 40% are 32 bit. Accordingly, about 60% of the total number of physical registers in the integer register file may be 64 bit and 40% of the total number may be 32 bit, saving about 20% area over a full 64 bit version.

In an embodiment, the map unit 16 may maintain separate free lists for the portions of the register file 24A, and may be configured to assign destination registers from the appropriate free list based on the operand size of a given integer op provided to the map unit 16. The free list management may thus be "aware" of the difference in implemented widths within the register file 24A. Source operands may be read from the current map of architected registers to physical registers. If a source operand of a 64 bit integer op is provided from a 32 bit physical register (e.g. the most recent write of the corresponding architected register was a 32 bit write in the 32 bit section of the register file 24A), the source operand may be zero-extended to provide the 64 bit value. In an embodiment, the register file 24A may be configured to perform the zero-extension based on the register address presented for the read. The execution units may zero-extend 32 bit results per architectural definition (e.g. to update a 64 bit register), and thus need not be "aware" of the multi-sized register file 24A. Accordingly, the hardware modifications to support the register file 24A being implemented in different-sized portion may be localized and minimal in an embodiment.

The reservation stations 20A-20C may each store ops to be executed by a corresponding execution unit 22A-22C. The reservation stations 20A-20C may be configured to track dependencies of the ops stored therein, and may be configured to schedule ops for which the dependencies have been satisfied (or are currently being satisfied by an executing op which will forward the result data to the op). In this embodiment, the reservation stations 20A-20C may track dependencies but may not actually capture operand data. Instead, a register file read in the register files 24A-24B may be used to read the operand data (and there may be forwarding paths for results generated by the execution units 22A-22C). Thus, the reservation stations 20A-20C may include storage implementing a number of entries for ops (e.g. random access memory arrays, flops, registers, etc.) as well as control circuitry configured to track/resolve dependencies and to schedule ops. Other embodiments may be configured to capture the operand data in the reservation stations as well. In such embodiments, the register files 24A-24B may be read as each op enters the reservation stations 20A-20C, and forwarded results may be captured by the reservation stations 20A-20C in addition to the register files 24A-24B updating with the forwarded results. In an embodiment in which there are multiple execution units 22A-22C of a given data type (e.g. multiple integer execution units 22A), the corresponding reservation stations 20A-20C may include separate reservation stations for each execution unit or a shared set of reservation stations that issue to each of the execution units. In other embodiments, a centralized scheduler may be used in place of the distributed reservation stations 20A-20C.

The integer execution units 22A may be configured to execute integer ops. Generally, an integer op is an op which performs a defined operation on integer operands. Integers may be numeric values in which each value corresponds to a mathematical integer. There may be at least one integer execution unit 22A, and there may be multiple integer execution units. In cases in which multiple integer execution units 22A are implemented, some execution hardware may be included in only a subset of the units. For example, one integer execution unit 22A may include a multiplier, while another integer execution unit 22A may include a divider. A subset of one or more integer execution units 22A may include branch processing hardware to process branch ops. Each of the integer execution units 22A may include other hardware such as adder hardware, shift/rotate hardware, logical operation hardware, etc. Since the integer execution units 22A operand on integer operands, the integer reservation stations 20A maybe coupled to the integer register file 24A to read source operands and the execution units 22A may be coupled to the integer register file 24A to write results.

The load/store execution units 22B may be configured to execute load/store ops. Generally, a load op may specify a transfer of data from a memory location to a register, while a store op may specify a transfer of data from a register to a memory location. The load/store execution units 22B may include load queues, store queues, and/or load/store queues to handle load/store ops that have generated memory addresses but are awaiting cache fills or to commit data to the cache or memory. The data cache 26 may be coupled to the load/store execution units 22B and may be accessed to complete load/store ops without transmission to the memory subsystem in the case of a cache hit. Load data read from the data cache 26 and/or forwarded from store queues in the load/store execution units 22B may be written to the register file 24A or 24B depending on the data type of the load op. Thus, the output of the data cache 26 is coupled to both the integer register file 24A and the floating point register file 24B. The load/store execution units 22B may use integer operands to generate the addresses accessed by the load/store ops, and thus the load/store reservation stations 20B may be coupled to the integer register file 24A to read source operands. Additionally, store data may be read from either the integer register file 24A (for integer store ops) or the floating point register file 24B (for floating point store ops).

The floating point execution units 22C may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment). Accordingly, the floating point reservation station 20C may be coupled to the floating point register file 24B to read source operands and the floating point execution units 22C may be coupled to the floating point register file 24B to write results.

While the illustrated embodiment includes particular execution units of various types, other embodiments may include different types of execution units and/or numbers of execution units of a given type, as desired. Additional execution units of other types may also be included (e.g. media units). Generally, media units may be configured to execute media ops. Media ops may be ops that have been defined to process media data (e.g. image data such as pixels, audio data, etc.). Media processing may be characterized by performing the same processing on significant amounts of data, where each datum is a relatively small value (e.g. 8 bits, or 16 bits, compared to 32 bits to 64 bits for an integer). Thus, media ops often include single instruction-multiple data (SIMD) or vector operations on an operand that represents multiple media data.

Each execution unit may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit 22A-22C may be an independent pipe for executing ops. The reservation stations 20A-20C may be part of the independent pipe with the corresponding execution unit 22A-22C.

The data cache 26 may have any cache geometry and capacity, in various embodiments. The data cache 26 may be write through, store in, or a combination thereof selectable by various attributes of the cache blocks stored therein.

Figure 2:
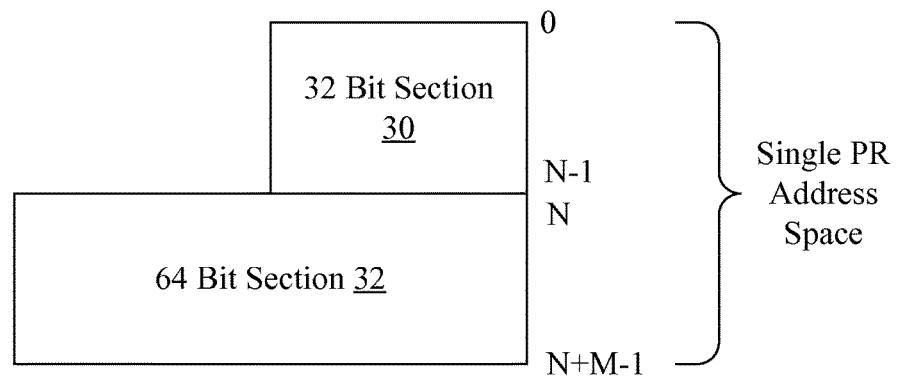
FIG. 2 is a block diagram of one embodiment of an integer register file.

Turning now to FIG. 2, a block diagram of one embodiment of the integer register file 24A is shown in greater detail. In the illustrated embodiment, the integer register file includes a 32 bit section (or portion) 30 and a 64 bit section (or portion) 32. As illustrated to the right of the sections 30 and 32, a single physical register (PR) address space may cover both sections. That is, the PRs in the integer register file may be numbered from 0 to N+M−1, where there are N 32 bit registers and M 64 bit registers. N and M may be integers greater than one, and need not be equal (although they may be equal in some embodiments, if desired). Thus, as mentioned previously, much of the processor 10 need not be changed so support the different-sized sections in the register file 24A. That is, to much of the circuitry in processor 10, it simply appears that there are N+M integer physical registers.

The sections 30 and 32 may be separate arrays, with separate decoders and outputs that are muxed together or otherwise selectable based on the input register address. The section 30 may include zeros on the most significant 32 bits of the 64 bit output bus, in an embodiment, to effectively zero extend 32 bit source operands to 64 bits. Alternatively, a single array may be provided, or a single array for the least significant 32 bits of the N+M registers and a second array for the most significant bits of registers N to N+M−1. Any circuit implementation of the register file 24A may be used.

Other embodiments may use separate address spaces for the 32-bit and 64-bit physical registers. In such embodiments, the differences between the 32-bit and 64-bit PRs may be more "visible" to other parts of the processor 10.

Figure 3:
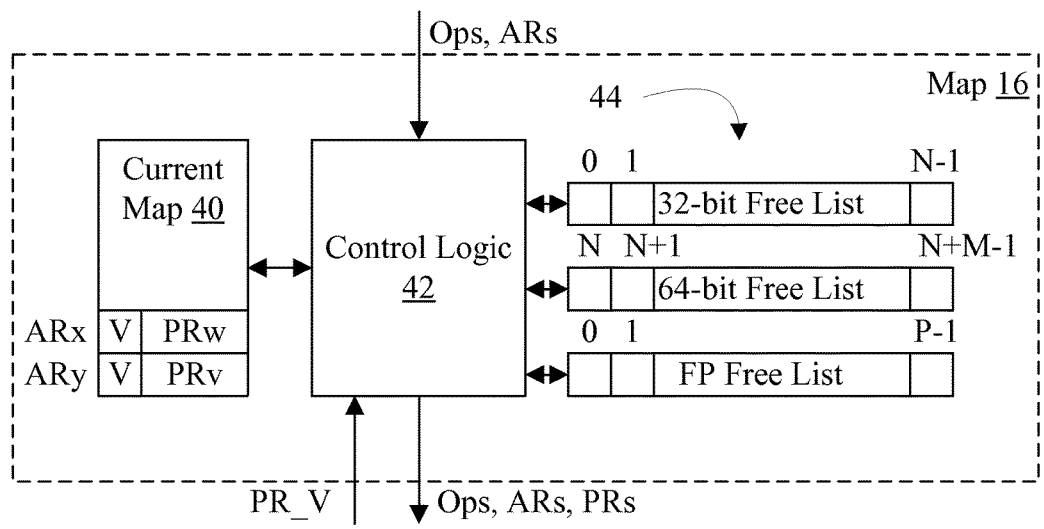
FIG. 3 is a block diagram of one embodiment of a map unit.

FIG. 3 is a block diagram of one embodiment of the map unit 16. In the embodiment of FIG. 3, the map unit 16 may include a current map 40, control logic circuitry 42, and free lists 44. The control logic 42 is coupled to the current map 40 and the free lists 44. The control logic 42 is further coupled to receive ops and architected register (AR) addresses for the operands of the ops. The AR addresses may include source AR addresses for the source operands and a destination AR address for the result. The control logic 42 may be configured to provide the ops and AR addresses, as well as physical register (PR) addresses corresponding to the PRs assigned to the ARs. For example, the control logic 42 may be configured to provide the ops, AR addresses, and PR addresses to the next pipeline stage (e.g. to the dispatch unit 18). The control logic 42 may be further coupled to receive PR valid (PR_V) indications corresponding to ops that are being executed.

The current map 40 may include a storage location for each AR. Storage locations for registers ARx and ARy are shown in FIG. 3. Each entry may include a PR address that is currently assigned to the AR. For example, PRw and PRv may be assigned to ARx and ARy, respectively, as shown in FIG. 3. Each entry may also include valid bit (V). The valid bit may indicate whether or not the update has occurred to the PR (that is, whether or not the op that was assigned the PR as a destination has executed). The PRs may be tracked by the reservation stations 20A-20C to determine when the dependencies for the ops have been satisfied. If the update has already occurred prior to the op passing through the map unit 16, the dependency is satisfied and the valid bit may be set. If not, the valid bit may be clear.

The PR address stored in the current map 40 may correspond to the most recent update to the corresponding AR. That is, the current map 40 may be speculative, and the most recent op in the speculative instruction stream to write the AR may be the op that was assigned the corresponding PR for its result. There may also be checkpoint maps and/or a non-speculative map for recovering from misspeculation (not shown in FIG. 3). The PR_V indications (e.g. PR addresses assigned to ops that have been issued for execution/being executed) may be compared to the PR addresses in the current map 40 (and other maps, if implemented) to set the valid bits. The valid bits may be cleared upon assignment of a new PR to the corresponding AR, responsive to an op having the AR as a destination.

Each AR address may be a register address in the architected register address space. The architected register address space may specify how each register is coded as an operand in the instructions defined in the instruction set architecture. Each PR address may be a register address identifying a physical register in one of the register files 24A-24B.

The free lists 44 may indicate which physical registers in the register files 24A-24B are free to assign to the destination ARs of ops being presented by the decode unit 14. A physical register may be free when the value stored therein is no longer needed by the processor 10 as a possible operand. For example, when an op is committed (or retired) and has a particular AR as a destination, the PR of the most recent non-speculative update to the AR may be free. Additionally, PRs of ops that are discarded due to misspeculation may be free once the misspeculated ops have been purged from the processor 10's pipelines.

The control logic 42 may be configured to assign PRs from the free lists 44 for each AR presented with an op. The control logic 42 may select the free list responsive to the data type (e.g. floating point versus integer in this example) and, for integer ops, the operand size. The free list may be, e.g., a bit vector having a bit for each PR in the corresponding register file or register file section. If the bit is set, the PR is free for assignment and if the bit is clear, the PR is in use and not available for assignment (or vice versa). Thus, in the illustrated embodiment, there are P floating point physical registers (addresses 0 to P−1) and thus there is a P-bit free list vector for the floating point register file 24B; there are M 64-bit integer physical registers (addresses N to N+M−1) and thus there is an M-bit free list vector for the 64 bit section 32 of the integer register file 24A; and there are N 32-bit integer physical registers (addresses 0 to N−1) and thus there is an N-bit free list vector for the 32 bit section 30 of the integer register file 24A. The control logic 42 may be configured to select a set bit in the free list vector, and the PR address of the PR may be inherent in the position of the selected set bit. The control logic 42 may be configured to clear the bit responsive to assigning the PR, until the corresponding PR is later freed and returned to the free list.

Figure 4:
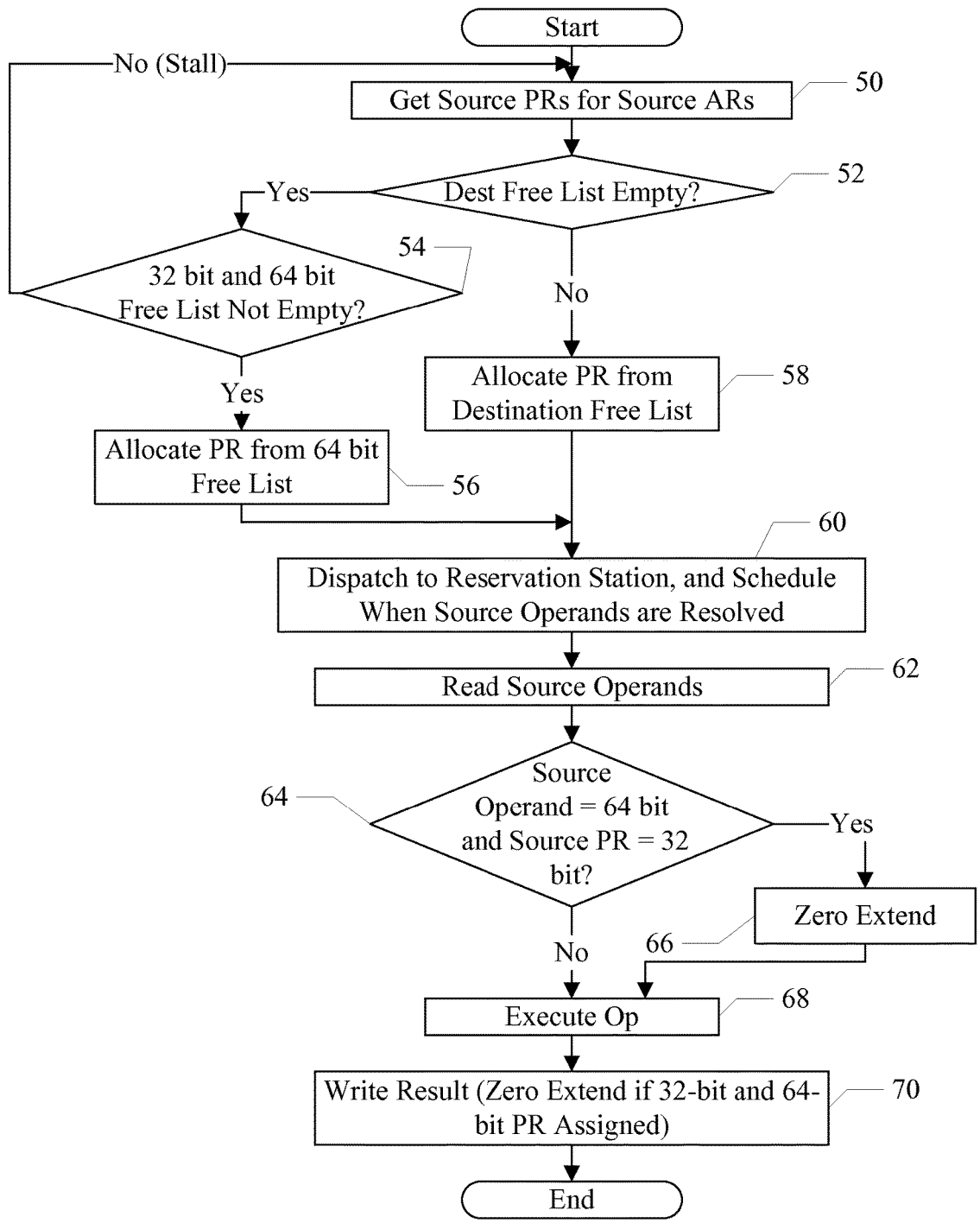
FIG. 4 is a flowchart illustrating operation of one embodiment of the processor.

FIG. 4 is a flowchart illustrating operation of one embodiment of the processor 10 is shown. While the blocks are shown in a particular order for ease of understanding, other orders may be used. Blocks may be performed in parallel in combinatorial logic within the processor 10. Blocks, combinations of blocks, and/or the flowchart as a whole may be pipelined over multiple clock cycles. The processor 10 and/or components thereof may be configured to implement the operation illustrated in FIG. 4. The operation of FIG. 4 may illustrate the handling of one op. Multiple ops may be handled by the map unit 16 in parallel, with intra-op dependency checking to override the PR addresses read from the current map 40 with destination PR addresses assigned to concurrently processed ops on which a dependency is detected. Ops may be processed in parallel in parallel pipelines as well.

An op may be received by the map unit 16 (and more particularly the control logic 42), and the source PR addresses may be obtained for each source AR of the op (block 50). The source PR addresses may be obtained from the current map 40, and if there are preceding (in speculative program order) ops that are being processed in parallel, through intra-op dependency checking as well. The map unit 16 may also consult the free list 44 associated with the destination operand. The free list may be selected responsive to the data type (e.g. floating point, integer, etc.) and, for some data types (e.g. integer), further responsive to the operand size. If the destination free list is empty, indicating that there are no free PRs of the data type and operand size (decision block 52, "yes" leg), in some embodiments the processor 10 may stall the op (and subsequent ops in the speculative program order as well). In the illustrated embodiment, the processor 10/map unit 16 may be configured to use 64 bit PRs for 32 bit PRs if the 32 bit free list is empty (decision block 54). Thus, if the destination free list is empty (decision block 52, "yes" leg) and the destination is 32 bit integer and the 64 bit integer free list is not empty (decision block 54, "yes" leg), the map unit 16 may be configured to allocate the PR from the 64 bit integer free list (block 56). If the destination free list is empty (decision block 52, "yes" leg) and the destination is not a 32 bit integer or the 64 bit integer free list is also empty (decision block 54, "no" leg), the map unit 16 may stall the op. If the destination free list is not empty (decision block 52, "no" leg), the map unit 16 may be configured to allocate the PR from the destination free list (block 58).

The dispatch unit 18 may be configured to dispatch the op to the reservation station 20A-20C associated with the op's data type, and the reservation station 20A-20C may be configured to schedule the op when the source operand dependencies are resolved (block 60). The source PR address of the scheduled op may be presented to the register file 24A or 24B (block 62). If a source PR is a 32 bit PR and the source operand is 64 bit (decision block 64, "yes" leg), the register file 24A may be configured to zero extend the 32 bit value from the PR to 64 bits (block 66). Other embodiments may sign extend, or select between sign extension and zero extension based on the op encoding.

The execution unit 22A-22C to which the op is scheduled may be configured to execute the op and generate a result (block 68). The execution unit 22A-22C may write the result to the destination PR of the instruction (in the register file 24A or 24B) (block 70). If the result is 32 bit and the assigned PR is 64 bit, the execution unit 22A may zero extend the result to update the PR. Alternatively, the result may be forwarded as a 64 bit result (zero extended if 32 bit) independent of the assigned PR, and thus the execution unit 22A need not decode the PR address to determine whether or not to zero extend. Other embodiments may sign extend, or selectively zero extend or sign extend based on the op encoding.

Figure 5:
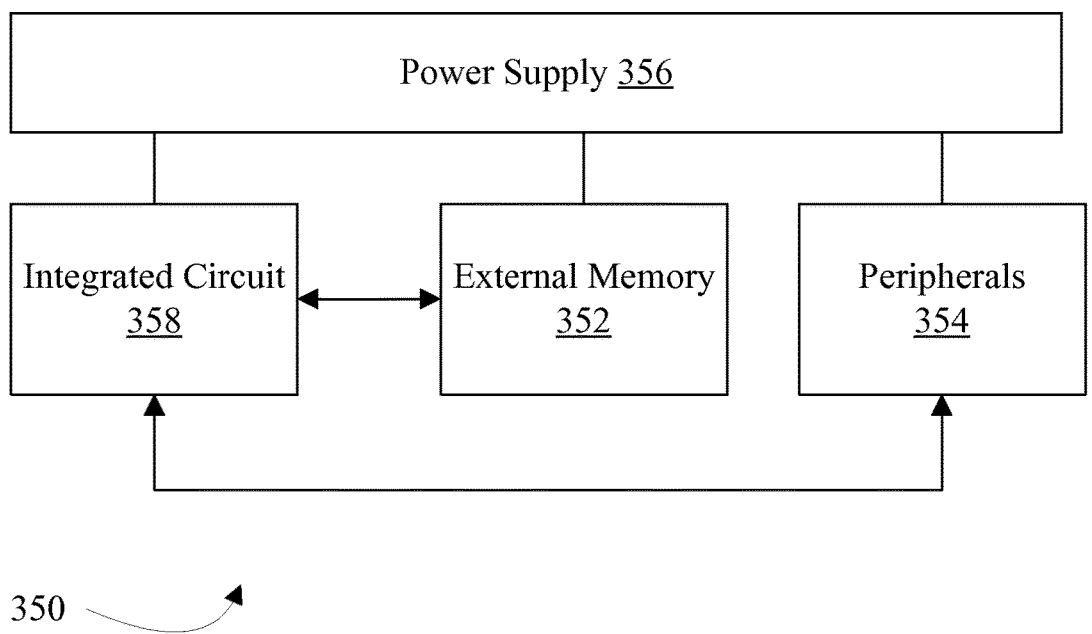
FIG. 5 is a block diagram of one embodiment of a system.

Turning now to FIG. 5, a block diagram of one embodiment of a system 350 is shown. In the illustrated embodiment, the system 350 includes at least one instance of an integrated circuit 358 coupled to an external memory 352. The integrated circuit 358 is also coupled to one or more peripherals 354. A power supply 356 is also provided which supplies the supply voltages to the integrated circuit 358 as well as one or more supply voltages to the memory 352 and/or the peripherals 354. In some embodiments, more than one instance of the integrated circuit 358 may be included (and more than one external memory 352 may be included as well).

The integrated circuit 358 may include one or more instances of the processor 10 shown in FIG. 1. In some embodiments, the integrated circuit 358 may include one or more instances of the processor 10 and one or more other components in a system on a chip (SOC) configuration.

The memory 352 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 358 in a chip-on-chip configuration, a package-on-package configuration, or a multi-chip module configuration.

The peripherals 354 may include any desired circuitry, depending on the type of system 350. For example, in one embodiment, the system 350 may be a mobile device (e.g. personal digital assistant (PDA), smart phone, etc.) and the peripherals 354 may include devices for various types of wireless communication, such as wifi, Bluetooth, cellular, global positioning system, etc. The peripherals 354 may also include additional storage, including RAM storage, solid state storage, or disk storage. The peripherals 354 may include user interface devices such as a display screen, including touch display screens or multitouch display screens, keyboard or other input devices, microphones, speakers, etc. In other embodiments, the system 350 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. A processor comprising:
a register file having a first portion corresponding to a first operand size and a first data type and a second portion corresponding to a second operand size and the first data type, wherein registers in the first portion are a first width specified by the first operand size and registers in the second portion are a second width specified by the second operand size, and wherein the first operand size is different from the second operand size, and wherein the first data type defines an interpretation of data in the registers; and
a map unit coupled to receive an instruction operation and configured to assign a register in the register file to a result of the instruction operation, wherein the map unit is configured to select the register from the first portion responsive to the instruction operation having the first operand size, and wherein the map unit is configured to select the register from the second portion responsive to the instruction operation having the second operand size.

2. The processor as recited in claim 1 wherein the first operand size is smaller than the second operand size, and wherein the map unit is configured to select the register from the second portion for the instruction operation having the first operand size responsive to a lack of availability of registers in the first portion.

3. The processor as recited in claim 2 further comprising an execution unit configured to execute the instruction operation, wherein the execution unit is configured to zero extend the result of the instruction operation to update the register.

4. The processor as recited in claim 1 wherein the first data type is integer.

5. The processor as recited in claim 1 wherein a single register address space of the register file covers both the first portion and the second portion.

6. The processor as recited in claim 1 wherein the map unit is further configured to assign one or more second registers to one or more source operands of the instruction operation responsive to a current mapping of registers to architected registers, and wherein, responsive to one of the one or more second registers being in the first portion and the operand size of the instruction operation being the second operand size, the processor is configured to zero extend the source operand from one of the one or more second registers prior to execution of the instruction operation.

7. The processor as recited in claim 6 wherein the register file is configured to zero extend the source operand responsive to a read of the source operand.

8. A method comprising:
receiving a first instruction operation having a first operand size and a first architected register address identifying a first architected register to which a result of the first instruction operation is to be written; and
assigning a first physical register in a register file to the first architected register responsive to the first instruction operation, wherein the register file has a first portion corresponding to the first operand size and a first data type and a second portion corresponding to a second operand size and the first data type, wherein registers in the first portion are a first width specified by the first operand size and registers in the second portion are a second width specified by the second operand size, and wherein the first operand size is different from the second operand size, and wherein the first data type defines an interpretation of data in the registers, and wherein the first physical register is assigned from the first portion.

9. The method as recited in claim 8 wherein the first operand size is smaller than the second operand size, and the method further comprising:
receiving a second instruction operation having the first operand size and a second architected register address identifying a second architected register to which a result of the second instruction operation is to be written;
detecting that each of the registers in the first portion is currently assigned to another architected register; and
assigning a second physical register in the second portion of the register file to the second architected register responsive to the detecting.

10. The method as recited in claim 9 further comprising executing the second instruction operation, wherein the executing includes zero-extending the result of the second instruction operation to update the second physical register.

11. The method as recited in claim 8 further comprising:
receiving a second instruction operation having the first operand size and a second architected register address identifying a second architected register to which a result of the second instruction operation is to be written;
detecting that each of the registers in the first portion is currently assigned to another architected register; and
stalling the second instruction operation responsive to the detecting.

12. The method as recited in claim 8 wherein the data type is integer.

13. The method as recited in claim 8 wherein a single register address space of the register file covers both the first portion and the second portion.

14. The method as recited in claim 8 further comprising:
assigning one or more second physical registers to one or more source operands of the first instruction operation responsive to a current mapping of physical registers to architected registers;
responsive to one of the one or more second physical registers being in the first portion and the operand size of the instruction operation being the second operand size, zero extending the source operand from the one of the second physical registers prior to execution of the instruction operation.

15. The method as recited in claim 14 wherein the zero-extending is performed by the register file responsive to a read of the source operand.

16. A processor comprising:
a register file having a first portion implementing a first width corresponding to a first operand size and a first data type and a second portion implementing a second width corresponding to a second operand size and the first data type; and
a map unit coupled to receive an instruction operation and configured to assign a register in the register file to a result of the instruction operation responsive to an operand size and a data type of the instruction operation, wherein the map unit is configured to maintain separate free lists for each of the first portion and the second portion of the register file, and wherein the map unit is configured to select the register from one of the free lists responsive to the operand size of the instruction operation.

17. The processor as recited in claim 16 wherein the first operand size is smaller than the second operand size, and wherein the map unit is configured to detect that a first free list corresponding to the first operand size is empty, and wherein the map unit is configured to select the register from a second free list corresponding to the second operand size responsive to the operand size being the first operand size and further responsive to detecting that the first free list is empty.

18. The processor as recited in claim 17 further comprising an execution unit configured to execute the instruction operation, wherein the execution unit is configured to zero extend the result of the instruction operation to update the register.

19. The processor as recited in claim 16 wherein a single register address space of the register file covers both the first portion and the second portion.

20. The processor as recited in claim 16 wherein the map unit is further configured to assign one or more second registers to one or more source operands of the instruction operation responsive to a current mapping of registers to architected registers, and wherein, responsive to one of the one or more second registers being in the first portion and the operand size of the instruction operation being the second operand size, the processor is configured to zero extend the source operand from the one of the one or more second registers prior to execution of the instruction operation.

* * * * *